United States Patent

Gabel

[15] 3,654,978

[45] Apr. 11, 1972

[54] POWERED CUTTER APPARATUS

[72] Inventor: Floyd S. Gabel, 5008 N.W. Steason, Oklahoma City, Okla. 73112

[22] Filed: Sept. 29, 1969

[21] Appl. No.: 861,771

[52] U.S. Cl. .................................................. 146/98
[51] Int. Cl. .................................................. B26d 1/28
[58] Field of Search .................................. 146/98, 163, 153

[56] References Cited

UNITED STATES PATENTS

| | | | |
|---|---|---|---|
| 1,082,926 | 12/1913 | Bondeson | ............................ 146/98 |
| 2,085,110 | 6/1937 | Luther | ................................... 146/98 |
| 2,941,560 | 6/1960 | McCaffery | ......................... 146/98 X |
| 3,148,720 | 9/1964 | Olson et al. | ............................ 146/98 |

Primary Examiner—Willie G. Abercrombie
Attorney—Dunlap, Laney, Hessin & Dougherty

[57] ABSTRACT

A powered machine for slicing bulk meat into relatively thin slices, the machine including a framework which carries rotatably mounted, spaced, disk cutter elements, and stripper fingers which project between the cutter elements and prevent the sliced meat from being diverted by the cutter elements from an intended path of travel. An endless conveyor is movably mounted on the framework for moving the bulk meat into the cutter elements, and sliding guide plates are mounted on the framework to position the meat on the conveyor before and after slicing.

5 Claims, 4 Drawing Figures

PATENTED APR 11 1972 3,654,978

INVENTOR
FLOYD S. GABEL

BY Dunlap, Laney, Hessin & Dougherty
ATTORNEYS

INVENTOR
FLOYD S. GABEL

POWERED CUTTER APPARATUS

BACKGROUND OF THE INVENTION

1. Field of the Invention

This invention relates to devices for cutting foodstuffs into a plurality of slices. More particularly, but not by way of limitation, the present invention relates to a powered meat cutter apparatus for slicing bulk meat configured as an elongated package into a plurality of relatively thin juxtapositioned slices.

2. Brief Description of the Prior Art

A number of machines have heretofore been proposed for slicing foodstuffs into thin slices to enhance marketability of such foodstuffs. For example, bread slicing machines have been proposed for cutting loaves of bread into bread slices, and one form of such machine has included a framework which has rotatably supported thereon, an elongated shaft carrying a plurality of aligned, disk-type cutter blades or elements which are spaced longitudinally along the shaft. A conveyor element moves elongated loaves of bread into contact with and through the rotating cutter elements with the result that the loaf of bread is sliced into a number of relatively thin juxtapositioned slices.

There have also been previously proposed various machines for slicing elongated packages of sausage meat, bologna, and the like. In some instances, these machines are constructed generally similarly to the described bread slicing machine, and in other instances, a reciprocating table is utilized in conjunction with a single disk-type cutter and with a moving ram which continuously feeds the meat toward the end of the reciprocating table which is adjacent the cutter. Then, as the table is reciprocated, a new slice of meat is cut from the package during each stroke of the table.

BRIEF DESCRIPTION OF THE PRESENT INVENTION

The present invention provides an improved powered meat cutter apparatus which is of the general type described as being previously in use for cutting a loaf of bread into juxtapositioned slices. The present invention, however, makes provision for several characteristics of packaged meat products which are not encountered in bread loaves, and which make the heretofore known bread slicing machines not entirely adequate or successful for the purpose of slicing elongated packages of meat.

Broadly described, the present invention comprises a framework having mounted thereon, an elongated conveyor. Also rotatably mounted on the framework are a plurality of spaced disk cutter elements which are located adjacent the conveyor and which function to slice through elongated packages of meat moved through the spaced cutter elements by the conveyor. A plurality of stripper fingers are mounted on the framework and project between the disk cutter elements at a location spaced above the conveyor so that any meat slices or parts thereof which might be inclined to adhere to, or be wedged between the disk cutter elements will be stripped therefrom and permitted to continue to be moved by the conveyor away from the cutter elements. Finally, a preferred embodiment of the invention includes guide plates which are mounted on the framework and are adjustably slidable in a direction which is substantially normal to the direction of the movement of the conveyor. The guide plates are mounted adjacent the conveyor and on opposite sides of the disk cutter elements, and function to confine the packaged meat carried by the conveyor to a selected position on the conveyor, both before cutting of the meat package, and after it has been sliced.

An object of the invention is to provide an improved powered cutter apparatus which is especially well adapted for cutting bulk meat products into relatively thin juxtapositioned slices.

Another object of the invention is to provide a powered meat cutter apparatus which can function effectively over extended periods of time without the cutter elements of the apparatus becoming clogged or jammed as a result of the adherence of fragments of meat thereto.

Another object of the invention is to provide a powered meat cutter apparatus which functions to slice bulk meat into slices which are retained by the apparatus in substantially the same overall configuration as the original mass of the meat subjected to slicing.

A further object of the invention is to provide a powered meat cutter apparatus which can be operated by a single individual to rapidly and efficiently slice meat into relatively thin slices ready for packaging for the market.

Another object of the invention is to provide a powered meat cutter apparatus which is relatively simple mechanically, is strong and durable, and is characterized in having a long and trouble-free operating life.

Additional objects and advantages of the invention will become apparent as the following detailed description of the invention is read in conjunction with the accompanying drawings which illustrate the invention.

DETAILED DESCRIPTION OF A PREFERRED EMBODIMENT OF THE INVENTION

Figure 1:
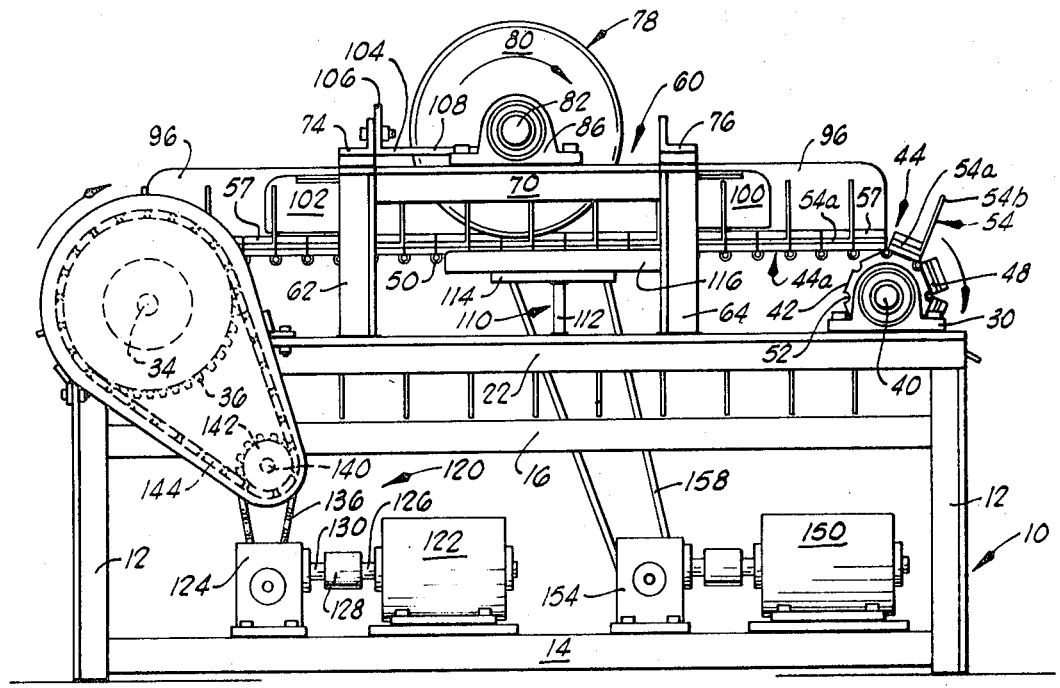
FIG. 1 is a side elevation view of a powered cutter apparatus constructed in accordance with one embodiment of the invention.

Referring initially to FIG. 1, shown therein is a powered cutter apparatus constructed in accordance with the present invention. This apparatus includes a framework 10 which includes four upstanding stanchions or support members 12, a pair of lower longitudinal beams 14 and a pair of central longitudinal beams 16. The framework also includes a pair of lower transverse beams 18 and a pair of upper transverse beams 20 disposed at substantially the same level as the longitudinal beams 14 and 16, respectively, and interconnecting the upstanding support members 12. At the top side of the framework 10, there are provided a pair of upper longitudinal beams 22 and 24 on opposite sides of the framework. Mounted at each of the four upper corners of the framework are journal blocks 26, 28, 30 and 32. The journal blocks 26 and 28 rotatably journal the opposite end portions of an elongated drive shaft 34, which drive shaft projects through the journal block 28 and carries at its outer end, a sprocket 36. Intermediate the length of the drive shaft 34 and between the opposite sides of the framework 10, a pair of drive wheels 38 are keyed to the drive shaft for rotation therewith. The specific construction of the drive wheels 38 will be hereinafter discussed.

Extending between the journal blocks 30 and 32 at the opposite end of the framework from the journal blocks 26 and 28 is a shaft 40. The shaft 40 carries intermediate its length and keyed thereto, a pair of drive wheels 42 which are constructed substantially identically to the drive wheels 38. An elongated endless conveyor 44 extends from one end of the framework to the other and passes over, and drivingly engages, the drive wheels 38. The endless conveyor 44, which may be described as having an upper run 44a and a lower run 44b, also passes over the drive wheels 42.

The endless conveyor 44, along with the drive wheels 38 and 42, is derived from a commercially available system sold under the tradename HINGE-VEYOR by the Borg-Warner Company of Ithaca, New York. The endless conveyor 44 used in the present invention has, however, been modified structurally from the commercially available conveyor to adapt it to use in the present invention. The endless conveyor 44 includes a series of substantially parallel, elongated plates 46 which are interconnected to each other through a pair of relatively short hinge plates 48. The opposite side edges of each hinge plate 48 are connected to the adjacent side edges of the elongated plates 46 by hinges 50 which project below the plane of these plates. The hinges 50 thus form protuberances which can be engaged by recesses 52 formed in the drive wheels 38 and 42 and complementary in shape to the hinges.

In accordance with the present invention, there is secured to each elongated plate 46, a fence plate 54 which is of L-shaped configuration. Each fence plate 54 has a longitudinally extending securement flange 54a which is secured by any suitable means to the upper surface of the respective elongated metal plate 46, and a serrated, upwardly extending flange which projects substantially normal to the upper surface of the respective metal plate 46, and is formed as a plurality of upwardly extending teeth 54b having spaces therebetween. These spaces permit passage through the teeth of the disk cutter elements hereinafter described. There is secured to the upper surfaces of each transversely aligned pair of the hinge plates 48, an elongated filler plate 56 which substantially fills the space between the fence plates carried by adjacent elongated metal plates 46 so as to provide a continuous supporting surface extending across the entire width of the endless conveyor 44. Short, parallel spacer plates 57 are secured to the upper surfaces of the securement flange 54a of the fence plate 54 and of the filler plate 56, and are spaced from each other so that the spaces therebetween are aligned with the spaces between the teeth 54b.

Secured to the top of the framework 10 is a superstructure designated generally by reference numeral 60. The superstructure 60 includes a pair of vertically extending supporting members 62 and 64 which are secured in longitudinally spaced relation to the upper longitudinal beam 22, and a pair of vertically extending supporting members 66 and 68 which are secured in longitudinally spaced relation to the upper longitudinal beam 24. The vertically extending supporting members 62–68 are disposed between the journal blocks 26 and 28 on one end of the framework, and the journal blocks 30 and 32 on the other end of the framework. A horizontal plate 70 is secured between the upper ends of the vertically extending supporting members 62 and 64, and a similar horizontal plate 72 is secured between the upper ends of the vertically extending supporting members 66 and 68. Extending transversely of the framework 10, and having their opposite ends secured to the horizontal plates 70 and 72 at points above the several vertically extending supporting members 62–68 are a pair of transverse angle irons 74 and 76.

Between the transverse angle irons 74 and 76 is located a cutter assembly designated generally by reference numeral 78. The cutter assembly 78 includes a plurality of disk-shaped cutter elements 80 which extend substantially parallel to each other and which are keyed to an elongated drive shaft 82. The cutter elements 80 are spaced from each other along the drive shaft 82 by spacers 84 which surround the drive shaft 82. The peripheral edge of each of the disk-shaped cutter elements is sharpened to facilitate cutting of an article passed therethrough in the manner hereinafter described. At its opposite ends, the drive shaft 82 passes through journal blocks 86 and 88 which are secured to the central portions of the horizontal plates 70 and 72. One end of the drive shaft 82 projects beyond the journal block 88 and carries a pulley 90 at its outer end for the purpose of driving the drive shaft in rotation in the manner hereinafter described.

Figure 2:
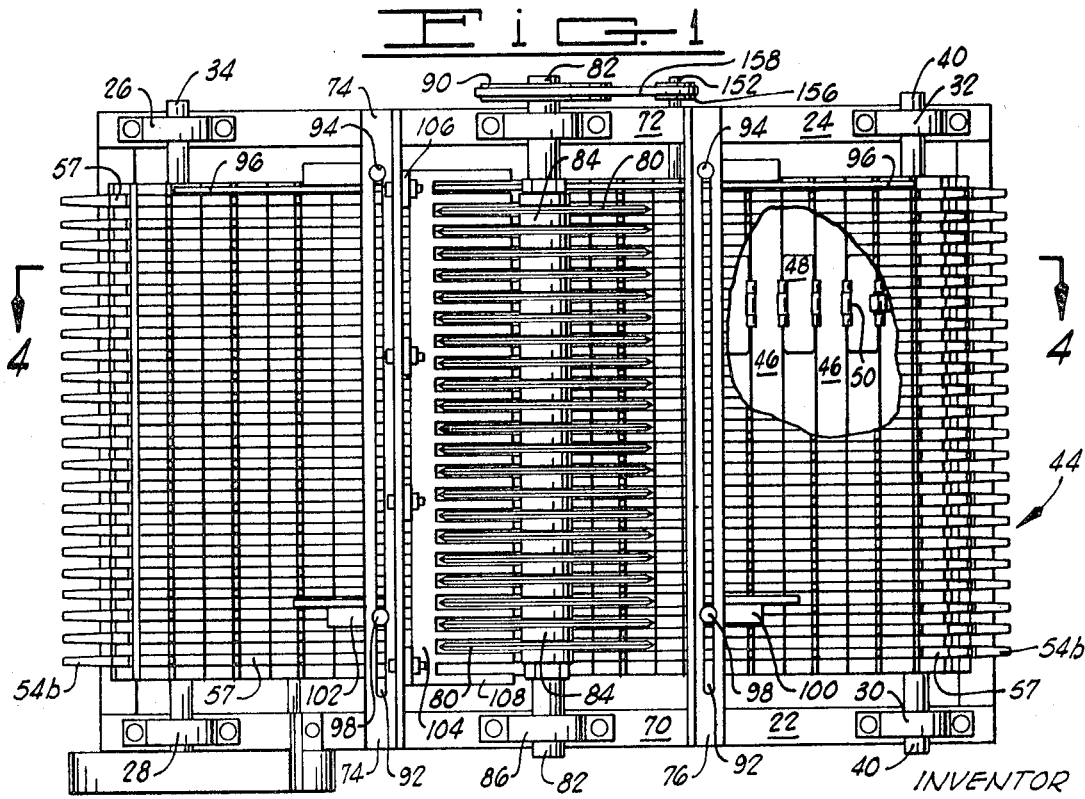
FIG. 2 is a plan view of the embodiment of the powered cutter apparatus which is illustrated in FIG. 1. A portion of the apparatus is broken away to illustrate certain details of structure.
Figure 3:
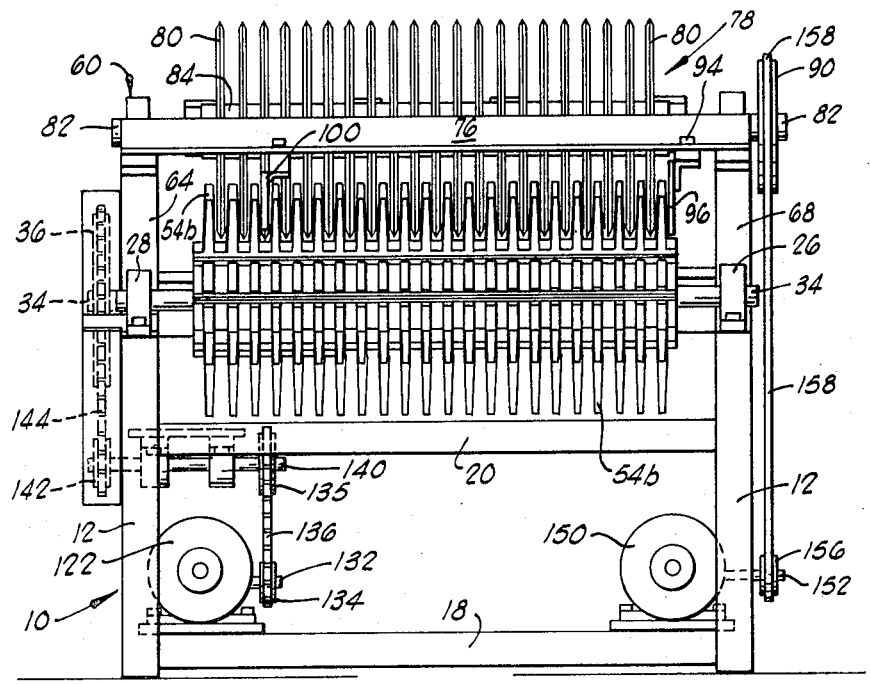
FIG. 3 is an elevation view of the embodiment of the powered cutter apparatus illustrated in FIGS. 1 and 2 as such apparatus appears when viewed from one end thereof.

It will be noted in referring to FIG. 2 that the horizontal flange portion of each of the transverse angle irons 74 and 76 is provided with an elongated slot 92 extending over a major portion of the length of each angle iron. The slots 92 accommodate bolts 94 which adjustably secure an elongated guide plate 96 to the under side of the angle irons 74 and 76. The elongated guide plate 96 extends to opposite ends of the framework 10, and is positioned immediately over the upper run 44a of the conveyor at one side of the conveyor. The slots 92 in the angle irons 74 and 76 also accommodate bolts 98 which adjustably secure a pair of sliding guide plates 100 and 102 to the angle irons on opposite sides of the cutter assembly 78. The sliding guide plates 100 and 102 include vertically extending portions adapted to bear flatly against the end of an elongated unsliced package of meat, and against the endmost slice of a package of meat which has passed through, and been sliced by, the cutter elements 80.

A horizontally extending stripper plate 104 is detachably secured to the upstanding flange of the angle iron 74 by a plurality of straps 106 which are bolted to the angle iron. The stripper plate 104 is serrated so as to provide a plurality of horizontally extending stripper fingers 108 which project between the several cutter elements 80 of the cutter assembly 78. It will be noted that the stripper fingers 108 are spaced upwardly from the horizontal plane of the upper run 44a of the endless conveyor 44. The stripper plate 104 and the stripper fingers 108 which it carries can be adjusted upwardly or downwardly in their position due to the slotted character of the straps 106 which permits them to be moved upwardly and downwardly when the bolts by which they are secured to the transverse angle iron 74 are loosened.

Extending transversely across the framework 10 is a T-member 110 which includes a vertically extending web 112 having a horizontal plate 114 secured across the top edge thereof. The plate 114 is secured to, and supports, a wooden support block 116 which functions to support the upper run 44a of the endless conveyor 44 for a purpose hereinafter described. The hinges 50 between the hinge plates 48 and the metal plates 46 of the conveyor 44 pass through channels 118 which extend across the wooden support block 116 (see FIG. 4).

Figure 4:
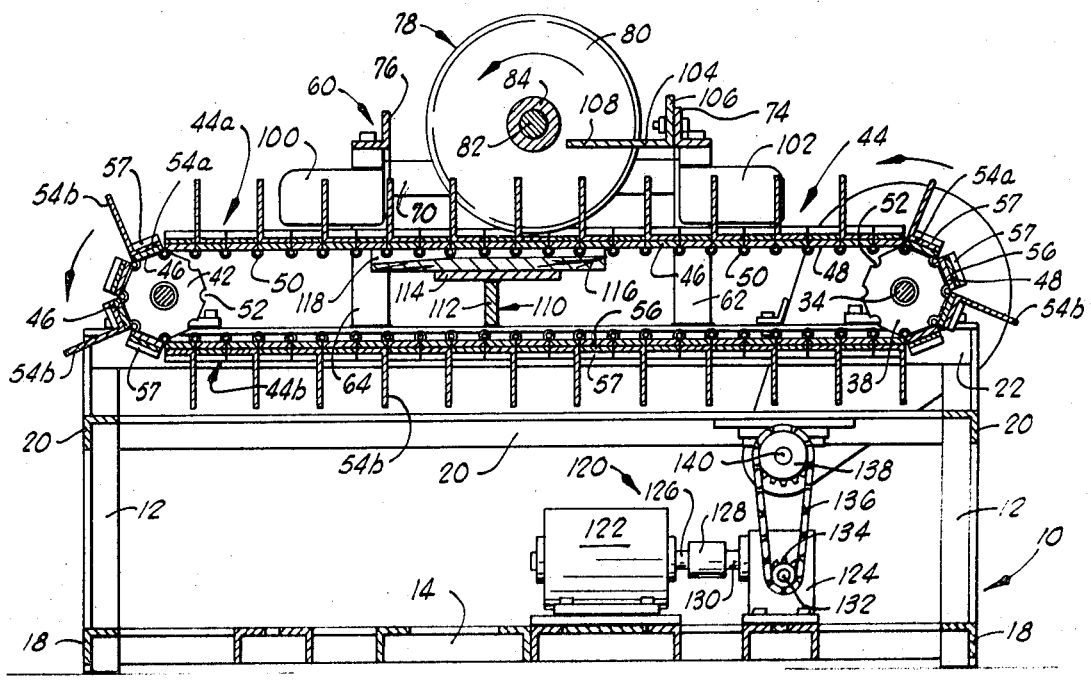
FIG. 4 is a sectional view of the powered cutter apparatus of the invention taken along line 4—4 of FIG. 2.

A preferred drive system for driving the endless conveyor 44 during the operation of the powered cutter apparatus of the invention is best illustrated in FIGS. 1 and 4, and is designated generally by reference numeral 120. The drive system 120 includes a motor 122 which drives a gear reducer 124 by means of an output shaft 126 which is coupled by a coupling 128 to the input shaft 130 of the gear reducer. The gear reducer 124 has an output shaft 132 to which is keyed a drive sprocket 134. A drive chain 136 extends around the drive sprocket 134 and around a larger driven sprocket 138. The driven sprocket 138 is keyed to a shaft 140 which extends through a suitable bearing block and carries a sprocket 142 at its end opposite the driven sprocket. A chain 144 extends around the sprocket 142 and around the sprocket 36 which is keyed to the drive shaft 34. Thus, when the motor is energized, the drive is transmitted through the described kinematic chain to the sprocket 36 which, in being keyed to the drive shaft 34, effectively drives the drive wheels 38 and the endless conveyor 44 in engagement therewith.

The drive for the cutter assembly 78 is best illustrated in FIGS. 1 and 2 and includes a motor 150 which drives an output shaft 152 through a speed reducer 154. The output shaft 152 carries a drive pulley 156 which engages a drive belt 158. The drive belt 158 is passed around and engages the pulley 90 keyed to one end of the drive shaft 82 upon which the cutter elements 80 are mounted.

OPERATION

In the use of the powered cutter apparatus of the invention, the motors 122 and 150 are energized. This causes the endless conveyor 44 to be placed in motion, and causes the cutter assembly 78 to be started so that the disk-shaped cutter elements 80 undergo rotation. An operator standing at the forward end of the machine at which the shaft 34 is located then places an article to be sliced by the powered cutter apparatus on the endless conveyor. It will be assumed for purposes of discussion that the operator is utilizing the machine for slicing elongated packages of meat. Such a package placed on the conveyor 44 rests upon the spacer plates 57 so that it can be cut completely through as hereinafter described.

As the endless conveyor 44 is driven in continuous motion by the drive wheels 38, the securement flanges 54a of the fence plates 54 are continually revolved into the horizontal plane occupied by the upper run 44a of the endless conveyor 44. It will be perceived that the upstanding teeth 54b of adjacent pairs of fence plates 54 form an elongated channel extending transversely with respect to the framework 10. The operator places one of the elongated packages of meat to be sliced in the channel formed by the upstanding teeth 54b of an adjacent pair of fence plates. The package is then moved toward the rotating cutter elements 80 by the conveyor.

It should be observed that prior to start-up, the operator has adjusted the sliding guide plates 100 and 102 to a transverse position on the framework such that these guide plates will just clear the end of the meat package placed between the upstanding teeth 54b of the fence plates. The sliding guide plates 100 and 102 are constructed so that the vertically extending portions thereof are sufficiently thin that they can be made to pass through adjacent teeth 54b of the fence plates. As the conveyor 44 moves the elongated meat package toward the cutter assembly 78, the vertically extending portion of the guide plate 102 prevents the meat package from moving transversely across the conveyor in the channel formed by adjacent fence plates as a result of vibration of the cutter apparatus or the like. Also, the sliding guide plate 102, in determining the position occupied by the meat package on the conveyor 44 prior to the time the meat package encounters the disk-shaped cutter elements 80 also determines the position which the sliced meat package will occupy on the conveyor as it passes through the cutter elements 80 to the opposite side of the cutter assembly 78. Thus, it is possible to position the sliding guide plate 102 on the downstream side of the cutter assembly 78 so that it will also be in close proximity to one end of the meat after it has passed through the cutter elements.

As the sliced meat package leaves the cutter assembly 78, it is retained in substantially the same configuration which characterized it prior to slicing as a result of its confinement between the sliding guide plate 100 and the elongated guide plate 92. Thus, as has been hereinbefore pointed out, the slices do not fall away from each other, but are maintained in their substantially parallel, juxtapositioned status. This facilitates removal of the sliced meat and packaging, if desired, for subsequent disposition.

As the meat package is moved by the conveyor into contact with the cutter elements 80, these rotating elements slice cleanly through the meat package and produce a series of juxtapositioned thin slices of meat. It will be noted that the function of the wooden support block 116 over which the endless conveyor 44 extends is to assure that the upper run 44a of the conveyor will be maintained in close proximity to the lowermost portions of the several cutter elements 80. Thus, the cutter elements 80 can cut easily and entirely through the vertical thickness of the meat package.

An important feature of the invention is the stripper plate 104 and the stripper fingers 108 carried thereby. The stripper plate is adjusted in its relationship to the conveyor 44 by moving it upwardly or downwardly prior to tightening the bolts by which the straps 106 are secured to the angle iron 74. The position of the stripper plate 104 during operation of the machine should be such that the stripper fingers 108 extend in a substantially horizontal plane which is spaced above the upper run 44a of the conveyor 44 by a distance substantially equivalent to the thickness in a vertical sense of the meat package to be sliced.

As the meat package is moved through the cutter assembly 78, the cutter elements 80 are being rotated in a clockwise direction as the cutter elements are viewed in FIG. 1 of the drawings. Thus, upstream from the cutter assembly 78, the rotating cutter elements 80 tend to lift upwardly any fragments or pieces of the meat which may be adhered to the cutter elements. With some types of meat which might be sliced by the apparatus, the tendency toward adherence of the meat to the cutter elements 80 is pronounced. The stripper fingers 108 function to wipe the sides of the cutter elements as they are being rotated and thus to prevent any adherence of meat particles or fragments to the cutter elements, and to maintain the integrity of the meat package in its sliced status.

Although certain preferred embodiments of the invention have been herein described in order to illustrate the manner in which the invention may be practiced and the apparatus disclosed may be constructed, it is to be understood that various changes and modifications in the described structure can be effected without departure from the basic principles of the invention. All changes and innovations of this type are therefore deemed to be circumscribed by the spirit and scope of the invention.

I claim:
1. A powered cutter apparatus comprising:
 a framework;
 a plurality of spaced, disc-shaped cutter elements mounted on said framework for rotation about a horizontal axis;
 conveyor means for moving a mass of soft, sticky meat to be cut against and through said cutter elements, said conveyor means comprising:
 an endless supporting means including:
  spaced elongated plates;
  hinge plates positioned between said spaced elongated plates; and
  hinges interconnecting said elongated plates and said hinge plates for permitting said elongated plates to open apart from each other when said endless supporting means passes through an arcuate path of travel; and
  fence plates secured to said spaced elongated plates and defining channels for receiving meat to be cut by said cutter means, said fence plates being secured to said elongated plates for projecting in divergent fashion with respect to each other from said endless supporting means when said endless supporting means passes through an arcuate path of travel, and for projecting from said endless supporting means in substantially parallel planes when said endless supporting means travels in a plane; and
 stripper fingers adjustably mounted on said framework above said conveyor means, and cantilevered from said framework for projection between said disc-shaped cutter elements, said stripper fingers each having a free end positioned between two of said cutter elements and each of said stripper fingers being upwardly yieldable in response to a pressure exerted from therebelow toward the free end thereof, said stripper fingers being vertically adjustable on said framework relative to said conveyor means whereby said stripper fingers may be positioned above and out of contact with material being cut resting on said conveyor means.

2. A powered cutter apparatus as defined in claim 1 and further characterized as including sliding guide plates supported on the framework and independently adjustable in a direction substantially normal to the direction of movement of said conveyor for positioning an article to be cut by said cutter elements.

3. A powered cutter apparatus as defined in claim 2 and further characterized to include an elongated guide plate supported on said framework above said conveyor means and cooperating with said guide plates to limit movement on said conveyor means of an article to be cut in a direction substantially normal to the direction of movement of the article by the conveyor means.

4. A powered cutter assembly as defined in claim 2 and further characterized as including:
 means mounted on said framework for driving said cutter elements in rotation; and
 means mounted on said framework for driving said conveyor means independently of said cutter elements.

5. A powered cutter assembly as defined in claim 4 and further characterized to include an elongated guide plate supported on said framework above said conveyor means and cooperating with said guide plates to limit movement on said conveyor means of an article to be cut in a direction substantially normal to the direction of movement of the article by the conveyor means.

* * * * *